United States Patent
Won et al.

(10) Patent No.: US 8,904,771 B2
(45) Date of Patent: Dec. 9, 2014

(54) EXHAUST HEAT RECOVERY APPARATUS FOR VEHICLE

(75) Inventors: Jong Seung Won, Gunpo-si (KR); Jongho Seon, Hwaseong-si (KR); Jaesan Kim, Yongin-si (KR); Sung Soo Chae, Suwon (KR); Jin-Yong Park, Suwon-si (KR); Jong-Yun Moon, Ulsan-si (KR); Jin-Yong Kim, Ulsan-si (KR)

(73) Assignees: Hyundai Motor Company, Seoul (KR); Kia Motors Corporation, Seoul (KR); Sejong Industrial Co., Ltd., Ulsan-Si (KR)

( * ) Notice: Subject to any disclaimer, the term of this patent is extended or adjusted under 35 U.S.C. 154(b) by 584 days.

(21) Appl. No.: 13/289,699

(22) Filed: Nov. 4, 2011

(65) Prior Publication Data

US 2012/0144814 A1 Jun. 14, 2012

(30) Foreign Application Priority Data

Dec. 9, 2010 (KR) ........................ 10-2010-0125528

(51) Int. Cl.
*F01N 3/02* (2006.01)
*F01N 5/02* (2006.01)
(Continued)

(52) U.S. Cl.
CPC ................. *F01N 5/02* (2013.01); *F01M 5/001* (2013.01); *F02G 5/02* (2013.01); *F28D 7/0066* (2013.01); *F28D 7/024* (2013.01); *F28D 7/103* (2013.01); *F28F 27/02* (2013.01); *F01N 2240/02* (2013.01); *F01N 2410/00* (2013.01); *F28D 21/0003* (2013.01); *F28D 2021/0089* (2013.01); *F28F 2250/06* (2013.01); *F28F 2270/00* (2013.01); *Y02T 10/16* (2013.01); *Y02T 10/166* (2013.01)

USPC .................. 60/320; 60/287; 60/288; 165/140; 165/141

(58) Field of Classification Search
CPC .................. F01N 5/02; F01N 2240/02; F01N 2240/0878; F01N 2240/0871; F01N 2240/0842; F01N 3/043; F01N 3/2053; F01N 13/14; F01N 13/082; F01N 13/02; F01P 2060/16
USPC ............. 60/287, 288, 298, 320; 165/140, 141
See application file for complete search history.

(56) References Cited

U.S. PATENT DOCUMENTS 6,095,240 A * 8/2000 Hassanein et al. ............ 165/141
6,748,906 B1 * 6/2004 White et al. ................ 123/41.01
(Continued)

FOREIGN PATENT DOCUMENTS

DE 2832571 * 2/1980
JP 2005-9789 A 1/2005
(Continued)

*Primary Examiner* — Thomas Denion
*Assistant Examiner* — Patrick Maines
(74) *Attorney, Agent, or Firm* — Morgan, Lewis & Bockius LLP

(57) ABSTRACT

An exhaust heat recovery apparatus for a vehicle, may include a case having an inlet and an outlet, a heat exchange part mounted in the case, the heat exchange part, a bypass tube connecting the inlet and the outlet of the case in the case, having an inflow opening for the inflow of the exhaust gas to the heat exchange part, and allowing an exhaust gas to bypass the heat exchange part, and a variable valve installed in the bypass tube to selectively block flow of the exhaust gas through the bypass tube and induce the exhaust gas to the heat exchange part, wherein the heat exchange part includes a coolant distribution member having a plurality of coolant paths connected to and spaced apart from each other between the bypass tube and the case, and a lubricant distribution member installed in one of the coolant paths and in which the lubricant flows.

12 Claims, 4 Drawing Sheets

(51) Int. Cl.
*F01M 5/00* (2006.01)
*F02G 5/02* (2006.01)
*F28D 7/00* (2006.01)
*F28D 7/02* (2006.01)
*F28D 7/10* (2006.01)
*F28F 27/02* (2006.01)
*F28D 21/00* (2006.01)

(56) References Cited

U.S. PATENT DOCUMENTS

2002/0153127 A1* 10/2002 Togawa et al. .................. 165/51
2002/0194846 A1* 12/2002 Moody ........................... 60/320
2006/0054381 A1    3/2006 Takemoto et al.

FOREIGN PATENT DOCUMENTS

| | | |
|---|---|---|
| JP | 2006-2676 A | 1/2006 |
| JP | 2008-133782 A | 6/2008 |
| JP | 4324216 B2 | 6/2009 |
| JP | 2010-24907 A | 2/2010 |
| JP | 2010-31671 A | 2/2010 |
| JP | 2010024907 A * | 2/2010 |
| JP | 2010031671 A * | 2/2010 |

* cited by examiner

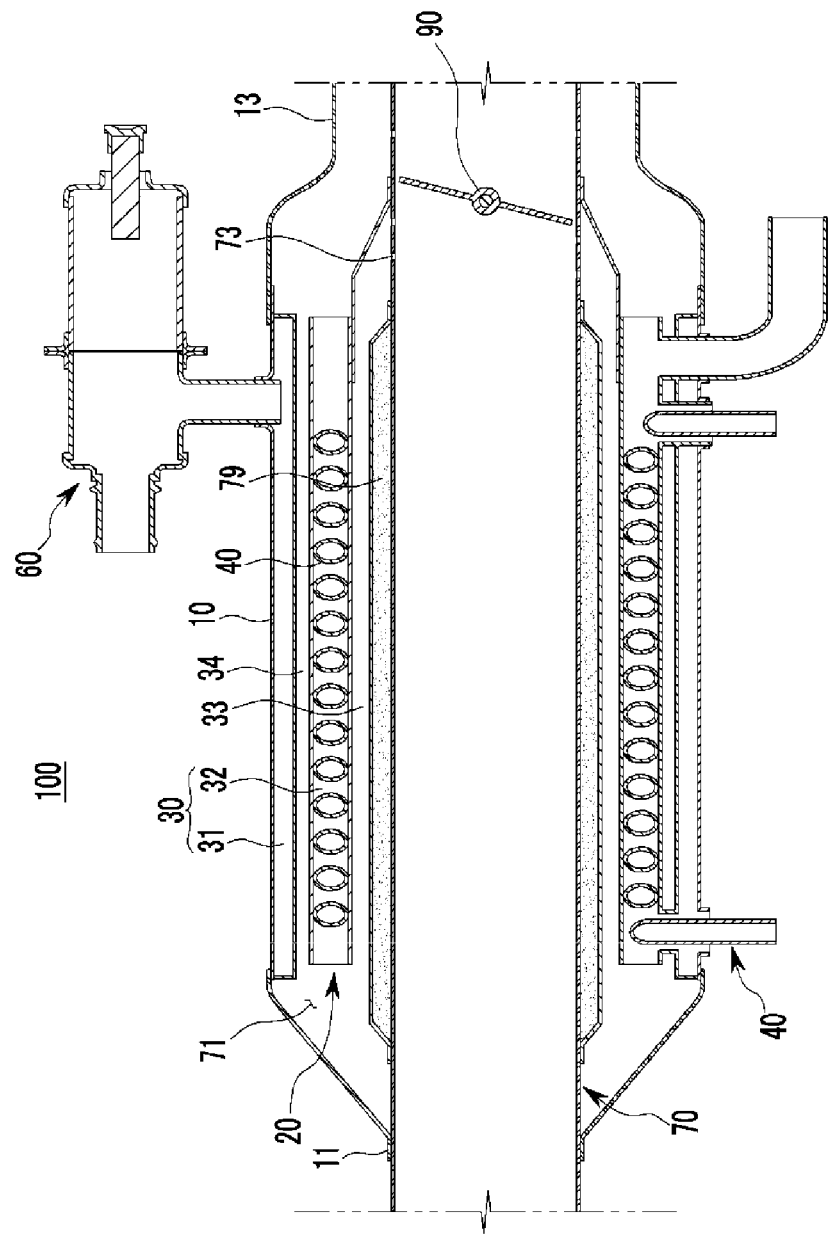

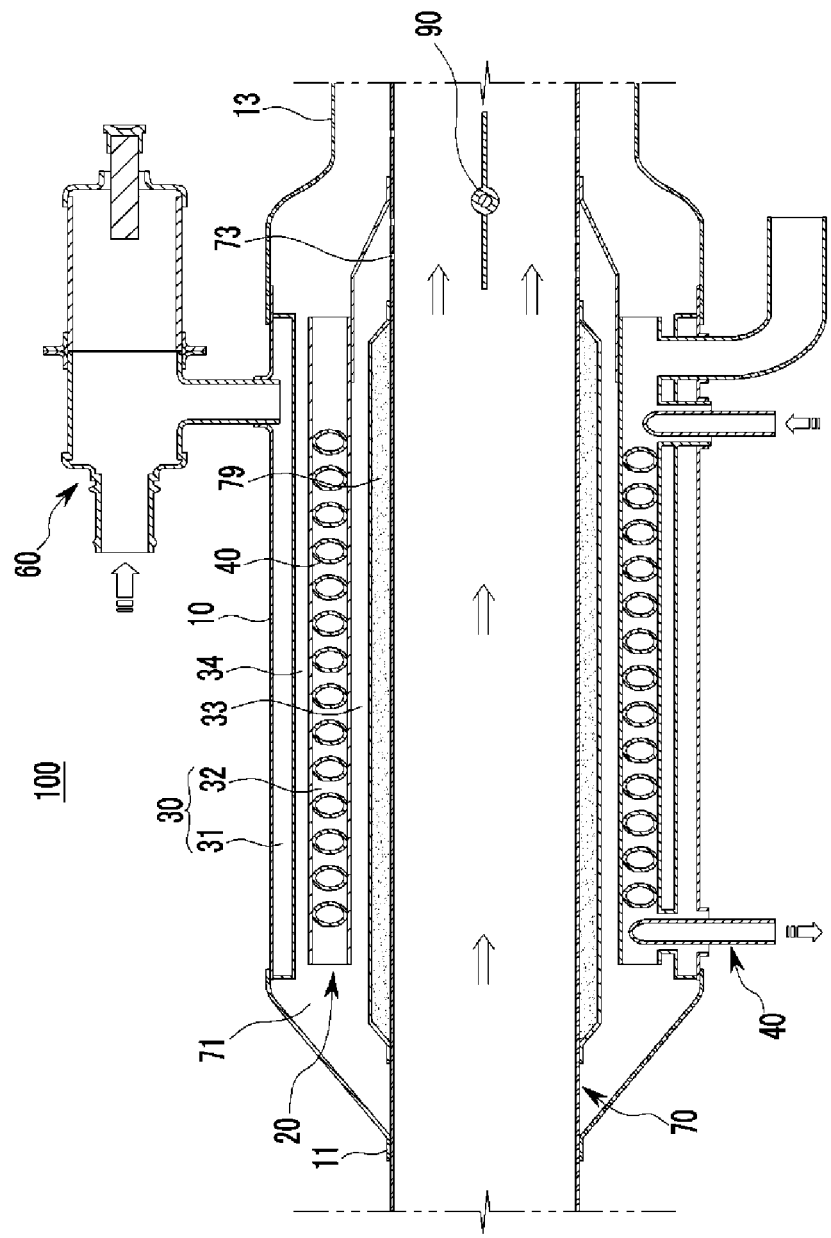

EXHAUST HEAT RECOVERY APPARATUS FOR VEHICLE

CROSS-REFERENCE TO RELATED APPLICATION

The present application claims priority to Korean Patent Application No. 10-2010-0125528 filed in the Korean Intellectual Property Office on Dec. 9, 2010, the entire contents of which is incorporated herein for all purposes by this reference.

BACKGROUND OF THE INVENTION

1. Field of the Invention

The present invention relates to a heat exchanger for exhaust heat recovery of a vehicle. More particularly, the present invention relates to an exhaust heat recovery apparatus for a vehicle in which a coolant and a lubricant are subjected to heat exchange for exhaust heat.

2. Description of Related Art

In general, a heat exchanger in a vehicle recovers exhaust heat by performing heat exchange between an exhaust gas and a coolant in such a manner as to lower the temperature of a high-temperature exhaust gas while increasing the temperature of a low-temperature coolant.

The heat, recovered through the heat exchanger, is transmitted to a part of a vehicle requiring heat, and used for the heating of a lubricant, the fast warming up of an engine, heating, and the like.

The heat exchanger is provided with a heat exchange part in which heat exchange with a coolant takes place. An exhaust gas exchanges its heat with the coolant while flowing through the heat exchange part. In a case where heat recovery is unnecessary, the heat exchanger changes a flow path such that the exhaust gas bypasses the heat exchange part.

For example, as for a structure for heating a lubricant by recovering the exhaust heat, the exhaust heat is made to pass through the heat exchange part. After the lubricant is heated to an appropriate temperature, the exhaust gas is made to bypass the heat exchange part to thus prevent a further increase in the temperature of the lubricant.

That is, at a low temperature or in initial starting, the high-temperature exhaust heat is supplied to the heat exchange part for the exchange of heat with the coolant. The coolant having increased in temperature increases the temperature of the lubricant. Since the lubricant has a high level of viscosity at a low temperature, the lubricant increases friction when supplied to a transmission or a work part of an engine. The lubricant heated by the coolant can reduce friction of the transmission, and the like.

The lubricant, when excessively heated, is degenerated and thus fails to properly perform lubrication. For this reason, at a high temperature or in acceleration, the exhaust gas is made to bypass the heat exchange part. In this case since heat exchange does not occur between the exhaust gas and the coolant, the coolant is maintained at a low temperature and the lubricant can be cooled by the low-temperature coolant.

In such a heat exchanger according to the conventional art, a single passage through which the coolant flows is disposed at a region in which the exhaust gas passes, and a tube through which the lubricant is distributed is installed within the passage to thus form the heat exchange part.

Accordingly, at the low temperature or in the initial starting of a vehicle, heat exchange between the exhaust gas and the coolant occurs in the region where the exhaust gas passes so as to increase the temperature of the coolant. The coolant can increase the temperature of the lubricant. The lubricant the temperature of which has been increased in the above manner contributes to enhancing fuel efficiency by reducing friction of the transmission, and the like.

However, since the heat exchanger according to the conventional art has the heat exchange part formed simply by installing a tube through which the lubricant is distributed within a single coolant path, the contact area and contact time of the coolant path with respect to the exhaust gas are insufficient. This may deteriorate heat-exchange performance and slow down the temperature increase of the lubricant, resulting in deterioration of fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an exhaust heat recovery apparatus for a vehicle having advantages of further increasing the contact are and contact time of a coolant path with respect to an exhaust gas.

In an aspect of the present invention, the exhaust heat recovery apparatus for a vehicle, may include a case having an inlet through which an exhaust gas may be introduced, and an outlet through which the exhaust gas may be selectively exhausted, a heat exchange part mounted in the case, the heat exchange part in which heat exchange of a coolant and a lubricant with respect to the exhaust gas may be conducted, a bypass tube connecting the inlet and the outlet of the case in the case, having an inflow opening for the inflow of the exhaust gas to the heat exchange part, and allowing an exhaust gas to bypass the heat exchange part, and a variable valve installed in the bypass tube to selectively block flow of the exhaust gas through the bypass tube and induce the exhaust gas to the heat exchange part, wherein the heat exchange part may include a coolant distribution member having a plurality of coolant paths connected to and spaced apart from each other between the bypass tube and the case, and a lubricant distribution member installed in one of the coolant paths and in which the lubricant flows.

The coolant distribution member forms an exhaust gas path between the coolant paths, the exhaust gas path being fluid-connected to the inflow opening.

The variable valve may be installed in a rear of the inflow opening in the bypass tube.

The heat exchange part may be mounted in a chamber formed between an exterior circumference of the bypass tube and an interior circumference of the case, wherein the coolant distribution member may include a first coolant path through which the coolant may be introduced from a coolant inlet, and a second coolant path fluid-connected to and spaced apart from the first coolant path, wherein the lubricant distribution member may be installed therein.

In the coolant distribution member, the first coolant path may be formed outside a concentric circle, and the second coolant path may be formed inside the concentric circle.

In the chamber, the first exhaust gas path fluid-connected with the inflow opening may be formed between the exterior circumference of the bypass tube and the second coolant path, and the second exhaust gas path may be formed between the first coolant path and the second coolant path, wherein the exhaust gas may be introduced into the first exhaust gas path in a direction and flown out through the second exhaust gas path in another direction.

The second coolant path may be formed adjacent to an inner circumference of the case.

The lubricant distribution member may be disposed in the second coolant path and formed as a tube passage wound in a coil shape.

An insulating layer may be provided on the exterior circumference of the bypass tube between the exterior circumference of the bypass tube and the first exhaust gas path.

According to an exemplary embodiment of the present invention, an exhaust gas, while flowing along the first and second exhaust gas paths and in the chamber of the heat exchange part at a low temperature or in initial starting, exchanges heat with a coolant flowing along the first and second coolant paths of the coolant distribution member.

Accordingly, in the present exemplary embodiment, the distribution path of the exhaust gas with respect to the path of the coolant can be increased, the contact area and contact time of the exhaust gas with respect to the path of the coolant can also be increased, and the coolant path performs heat insulation, thus further enhancing the heat-exchange performance of the coolant and the lubricant with respect to the exhaust gas.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a schematic cross-sectional view illustrating an exhaust heat recovery apparatus for a vehicle according to an exemplary embodiment of the present invention.

FIG. 2A and FIG. 2B are schematic cross-sectional views for describing the operation of an exhaust heat recovery apparatus for a vehicle according to an exemplary embodiment of the present invention.

Figure 2A:
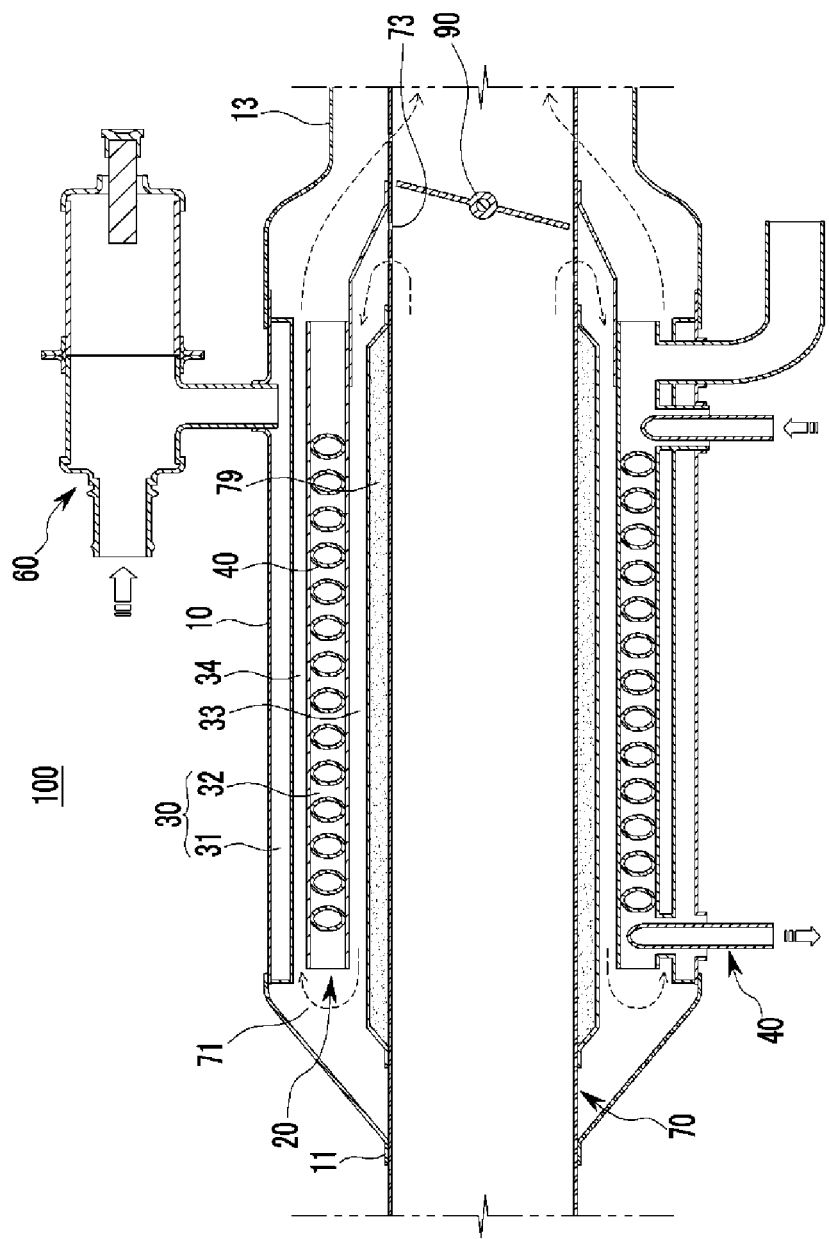

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic cross-sectional view illustrating an exhaust heat recovery apparatus for a vehicle according to an exemplary embodiment of the present invention.

With reference to FIG. 1, the exhaust heat recovery apparatus 100 for a vehicle, according to an exemplary embodiment of the present invention, may be applied to an exhaust system of a vehicle for exhausting an exhaust gas generated from an engine.

Here, the exhaust heat recovery apparatus 100 has a structure that recovers exhaust heat by lowering the temperature of a high-temperature exhaust gas and increasing the temperature of a low-temperature coolant. Then, heat recovered in the above manner can be used for heating the lubricant (generally referred to as "ATF" or "transmission oil") warming up an engine, and heating and the like.

That is, the exhaust heat recovery apparatus 100 serves to enhance fuel efficiency through the heat exchange of an engine coolant and a lubricant with respect to exhaust heat energy, being exhausted to the outside, improve heating performance, and improve noise/vibration/harshness (NVH) performance to an equivalent level of that for an auxiliary muffler.

To this end, the exhaust heat recovery apparatus 100 according to an exemplary embodiment of the present invention basically includes a case 10, a heat exchange part 20, a bypass tube 70, and a variable valve 90. Hereinafter, each of these constituents will be described.

In the present exemplary embodiment, the case 10 forms an exterior of the exhaust heat recovery apparatus 100, and may be installed at an exhaust line through which an exhaust gas passes, or at the outer side of the bypass tube 70 to be described later so as to maintain air-tightness.

An inlet 11 for the inflow of an exhaust gas is formed at one end of the case 10, and an outlet 13 for the exhaust of an exhaust gas is formed at the other end thereof.

In the present exemplary embodiment, the heat exchange part 20 is disposed in the path of the exhaust gas for the heat exchange of a coolant and a lubricant with respect to the exhaust gas. The heat exchange part 20 forms a distribution path of the coolant and the lubricant, and may be provided in the case 10.

The details regarding the construction of the heat exchange part 20, according to the present exemplary embodiment, will be described in more detail.

In the present exemplary embodiment, the bypass tube 70 may exhaust (bypass) the exhaust gas to the outside of the case 10, and may be disposed at the center of the exhaust heat recovery apparatus 100 and penetrate the case 10 such that the heat exchange part 20 is not placed within the tube passage. The bypass tube 70 may be directly coupled to the exhaust line through which an exhaust gas passes.

Here, the inlet 11 of the case 10 is connected to one end of the bypass tube 70 as the bypass tube 70 is disposed inside the case 10, but is not in communication with the one end of the bypass tube 70.

Also, the outlet 13 of the case 10 may be in communication with the other end of the bypass tube 70 as the bypass tube 70 is disposed inside the case 10.

Thus, in a case where the path of the exhaust gas is predetermined not to pass through the heat exchange part 20, the exhaust gas introduced through the inlet 11 of the case 10 may pass through the bypass tube 70 and be directly exhausted (bypassed) to the outlet 13 of the case 10.

In a case where the path of the exhaust gas is predetermined to pass through the heat exchange part 20, the exhaust gas passes through the bypass tube 70, and may flow between the bypass tube 70 and the case 10 at the side of the outlet 13 of the case 10.

As described above, the bypass tube 70 is disposed with its outer wall being spaced apart from the inner wall of the case 10 at a predetermined distance. Thus, a chamber 71 is defined as a predetermined space between the outer wall of the bypass tube 70 and the inner wall of the case 10.

In this case, the chamber 71 serves as a path through which the exhaust gas introduced from the side of the outlet 13 of the case 10, and the heat exchange part 20 to be described later in more detail may be mounted in this path.

To this end, the bypass tube 70 has an inflow opening 73 at the front end of the outside side of the case 10, and the inflow opening 73 is in communication with the chamber 71. The inflow opening 73 may be formed along the circumference of the bypass tube 70.

Accordingly, in a case where an exhaust gas flowing along the bypass tube 70 through the inlet 11 of the case 10 is predetermined to pass through the heat exchange part 20, the exhaust gas flows into the chamber 71 through the inflow opening 73 at the side of the outlet 13 of the case 10, then passes through the heat exchange part 20 in the chamber 71, and goes out through the outlet 13 of case 10.

In the present exemplary embodiment, the variable valve 90 opens or closes the tube passage of the bypass tube 70 so as to block the flow of the exhaust gas through the bypass tube 70 or induce the exhaust gas to the heat exchange part 20, and selectively switches the path of the exhaust gas to the heat exchange part 20 or to the bypass tube 70. Such a variable valve 90 is installed at the end of the bypass tube 70 in the side of the outlet 13 of the case 10.

That is, in a case where the bypass tube 70 is closed by the operation of the variable valve 90 at a low temperature or in initial starting, the exhaust gas is induced to the chamber 71 through the inflow opening 73 of the bypass tube 70, and passes through the heat exchange part 20 in the chamber 71. The exhaust gas may then be exhausted through the outlet 13 of the case 10.

In a case where the bypass tube 70 is opened by the operation of the variable valve 90 at a high temperature or in high-speed driving, the exhaust gas passes through the tube passage of the bypass tube 70, and may be directly exhausted through the outlet 13 of the case 10.

The above variable valve 90 may be formed as a typical valve structure for opening and closing the tube passage. The variable valve 90 may be, for example, a plate type structure rotated about a hinge shaft, or a circular plate type throttle valve structure. The variable valve 90 may be mechanically opened/closed by being connected to a separate driving unit.

The structure of the variable valve 90 or the driving unit for driving the variable valve 90 is a well-known technique, and therefore, further details thereof will be omitted in the present specification.

Hereinafter, the construction of the heat exchange part 20 will be described in more detail. In the present exemplary embodiment, the heat exchange part 20 is provided between the bypass tube 70 and the case 10, and allows for the heat exchange of the coolant and the lubricant with respect to the exhaust gas.

That is, in a case where the bypass tube 70 is opened by the operation of the variable valve 90 at a high temperature or in high-speed driving, the heat exchange part 20 causes the heat exchange of the coolant and the lubricant with respect to the exhaust gas while the exhaust gas flows into the chamber 71 through the inflow opening 73 of the bypass tube 70 and is exhausted through the outlet 13 of the case 10.

The heat exchange part 20 contributes to increasing the contact area and contact time of the exhaust gas with respect to the path in which the coolant is distributed, and allows the distribution path of the coolant to perform heat-retaining, thus further improving heat-exchange performance.

The heat exchange part 20 includes a lubricant distribution member 40 and a coolant distribution member 30 configured in the chamber 71 between the bypass tube 70 and the case 10.

The coolant distribution member 30 includes a plurality of coolant paths 31 and 32 connected to and spaced apart from each other between the bypass tube 70 and the case 10. Also, the coolant distribution member 30 includes an exhaust gas part 34 between the coolant paths 31 and 32, the exhaust gas part 34 being connected to the above inflow opening 73 between the coolant paths 31 and 32.

Hereinafter, the coolant distribution member 30, according to the present exemplary embodiment, will be described in more detail. The coolant distribution member 30 includes the first coolant path 31 for the inflow of the coolant, and the second coolant path 32 connected to and spaced apart from the first coolant path 31 and in which the lubricant distribution member 40 to be described later is installed.

That is, with reference to the section of the coolant distribution member 30, the first coolant path 31 is formed outside a concentric circle while the second coolant path 32 is formed inside the concentric circle.

In this case, the second coolant path 32 is spaced apart from the exterior circumference of the bypass tube 70 at a predetermined distance.

Here, as the coolant distribution member 30 having the first and second coolant paths 31 and 32 is configured in the chamber 71 between the bypass tube 70 and the case 10, a first exhaust gas path 33 connected to the inflow opening 73 of the bypass tube 70 may be formed between the exterior circumference of the bypass tube 70 and the second coolant path 32 within the chamber 71.

Furthermore, a second exhaust gas path 34 connected to the first exhaust gas path 33 may be formed between the first coolant path 31 and the second coolant path 32.

The above lubricant distribution member 40 is a tube part allowing for the flow of the lubricant, and is provided in the second coolant path 32 to be wound in the form of a coil shape.

Meanwhile, an insulation layer 79 filled with a filler such as glass fiber or the like is provided on the exterior circumference of the bypass tube 70 in order to perform insulation between the bypass tube 70 and the chamber 71, and noise reduction.

In the drawing, non-described reference numeral 60 represents a coolant inlet through which the coolant is injected to the coolant distribution member 30.

Hereinafter, the operation of the exhaust heat recovery apparatus 100 according to an exemplary embodiment of the present invention will be described in detail with reference to the accompanying drawings.

FIG. 2A and FIG. 2B are schematic cross-sectional views for explaining the operation of the exhaust heat recovery apparatus for a vehicle according to an exemplary embodiment of the present invention.

First, referring to FIG. 2A, the bypass tube 70 is in a closed state by the variable valve 90 at a low temperature or in initial starting. Thus, the inflow opening 73 of the bypass tube 70 and the chamber 71 within the case are opened to each other.

In this case, the coolant is distributed through the first coolant path 31 and the second coolant path 32 of the coolant distribution member 30 of the heat exchange part 20, and the lubricant is distributed through the coil-type tube passage of the lubricant distribution member 40.

In this state, the exhaust gas introduced through the inlet 11 of the case 10 flows into the bypass tube 70, and then flow into the chamber 71 through the inflow opening 73 of the bypass tube 70 without being exhausted through the outlet 13 of the case 13 due to the closed variable valve 90.

That is, since the exhaust gas is induced toward the heat exchange part 20, the exhaust gas is introduced to the first exhaust gas path 33 between the exterior circumference of the bypass tube 70 and the second coolant path 32.

Thereafter, the exhaust gas flows along the second exhaust gas path 34 between the first coolant path 31 and the second coolant path 32 in the chamber 71, and then flows toward the end of the bypass tube 70 at the side of the outlet 13 of the case 10. Then, the exhaust gas may thus be exhausted.

In the above process, the high-temperature exhaust gas while flowing along the first exhaust gas path 33 in the chamber primarily exchanges heat with the coolant flowing along the first and second coolant paths 31 and 32 of the coolant distribution member 30. Also, the high-temperature exhaust gas flowing along the second exhaust gas path 34 secondarily exchanges heat with the coolant flowing along the first and second coolant paths 31 and 32 of the coolant distribution member 30.

The temperature of the coolant is increased through the above heat exchange, and the heat of the coolant is transmitted to the lubricant flowing along the lubricant distribution member 40, thus finally increasing the temperature of the lubricant.

Accordingly, in the present exemplary embodiment, the lubricant having increased in temperature reduces friction of an engine and a transmission, thus enhancing fuel efficiency.

Meanwhile, in the present exemplary embodiment, there is a need to cool the lubricant because the temperature of the lubricant is increased at a high temperature or in high-speed driving.

Therefore, according to the present exemplary embodiment, the variable valve 90 is opened as shown in FIG. 2B, thus switching the flow of the exhaust gas. That is, the flow of the exhaust gas is induced toward the bypass tube 70.

That is, when the variable valve 90 is opened, the bypass tube 70 is opened, and thus the exhaust gas introduced through the inlet 11 of the case 11 passes through the tube passage of the bypass tube 70 and is directly exhausted through the outlet 13 of the case 10 without passing through the heat exchange part 20.

As describe above, as the exhaust gas flows out through the bypass tube 70 without passing through the heat exchange part 20, heat exchange between the coolant and the exhaust gas does not occur. Thus, the temperature of the coolant is maintained at a low temperature, and the lubricant exchanges heat with the low-temperature coolant, thus being cooled to an approximate temperature.

As set forth herein, in the exhaust heat recovery apparatus 100 according to an exemplary embodiment of the present invention, an exhaust gas, flowing along the first and second exhaust gas paths 33 and 34 in the chamber 71 of the heat exchange part 20 at a low temperature or in initial starting, exchanges heat with a coolant flowing along the first and second coolant paths 31 and 32 of the coolant distribution member 30.

Accordingly, in the present exemplary embodiment, the distribution path of the exhaust gas with respect to the path of the coolant can be increased through the coolant distribution member 30, the contact area and contact time of the exhaust gas with respect to the path of the coolant can also be increased, and particularly, the first coolant path 31 of the coolant distribution member 30 serves to keep the second coolant path 32 warm.

Figure 3:
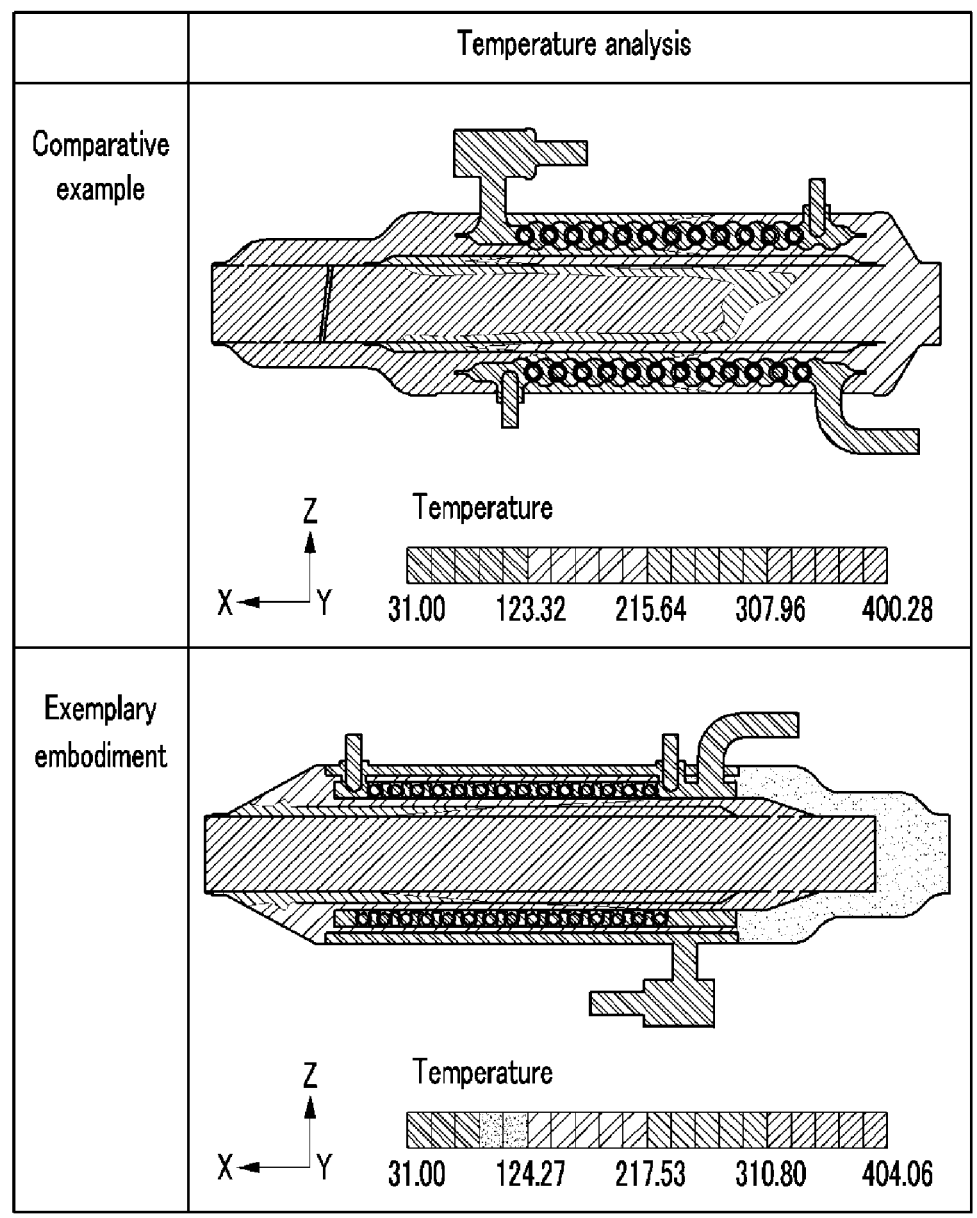
FIG. 3 is a view for describing the effect of an exhaust heat recovery apparatus for a vehicle according to an exemplary embodiment of the present invention.

Thus, as shown FIG. 3, according to a present exemplary embodiment, the heat exchange performance of a coolant and a lubricant with respect to an exhaust gas can be enhanced further than a comparative example shown in FIG. 3, that is, a conventional art in which a single coolant path is formed in a region where an exhaust gas passes, and a tube through which the lubricant is distributed is installed inside the coolant path to thereby form a heat exchange part.

That is, as compared to the comparative example, in the present exemplary embodiment, the temperature of the exhaust gas can be further lowered, the temperatures of the coolant and the lubricant can be increased, and the amount of heat transfer in the heat exchange of the exhaust gas can be significantly increased.

For convenience in explanation and accurate definition in the appended claims, the terms "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust heat recovery apparatus for a vehicle, comprising:
   a case having an inlet through which an exhaust gas is introduced, and an outlet through which the exhaust gas is selectively exhausted;
   a heat exchange part mounted in the case, the heat exchange part in which heat exchange of a coolant and a lubricant with respect to the exhaust gas is conducted;
   a bypass tube connecting the inlet and the outlet of the case in the case, having an inflow opening for inflow of the exhaust gas to the heat exchange part, and allowing the exhaust gas to bypass the heat exchange part; and
   a variable valve installed in the bypass tube to selectively block flow of the exhaust gas through the bypass tube and induce the exhaust gas to the heat exchange part,
   wherein the heat exchange part includes a coolant distribution member having a plurality of coolant paths connected to and spaced apart from each other between the bypass tube and the case, and a lubricant distribution member installed in one of the coolant paths and in which the lubricant flows.

2. The exhaust heat recovery apparatus of claim 1, wherein the coolant distribution member forms an exhaust gas path between the coolant paths, the exhaust gas path being fluid-connected to the inflow opening.

3. The exhaust heat recovery apparatus of claim 1, wherein the variable valve is installed in rear of the inflow opening in the bypass tube.

4. The exhaust heat recovery apparatus of claim 1, wherein the heat exchange part is mounted in a chamber formed between the bypass tube and the case.

5. The exhaust heat recovery apparatus of claim 4, wherein the coolant distribution member includes:
   a first coolant path through which the coolant is introduced; and
   a second coolant path fluid-connected to and spaced apart from the first coolant path, wherein the lubricant distribution member is installed in the second coolant path.

6. The exhaust heat recovery apparatus of claim 5, wherein, in the coolant distribution member, the first coolant path is formed outside a concentric circle, and the second coolant path is formed inside the concentric circle.

7. The exhaust heat recovery apparatus of claim 5, wherein in the chamber, a first exhaust gas path which is fluid-connected with the inflow opening is formed between the bypass tube and the second coolant path, and a second exhaust gas path is formed between the first coolant path and the second coolant path.

8. The exhaust heat recovery apparatus of claim 7, wherein the exhaust gas is introduced into the first exhaust gas path in a direction and flowed out through the second exhaust gas path in another direction.

9. The exhaust heat recovery apparatus of claim 7, wherein the second coolant path is formed adjacent to the case.

10. The exhaust heat recovery apparatus of claim 5, wherein the lubricant distribution member is disposed in the second coolant path and formed as a tube passage wound in a coil shape.

11. The exhaust heat recovery apparatus of claim 5, wherein an insulation layer is provided on the bypass tube between the bypass tube and the first exhaust gas path.

12. The exhaust heat recovery apparatus of claim 4, wherein an insulation layer is provided on an exterior of the bypass tube.

* * * * *